US009932509B2

(12) United States Patent
Obrestad et al.

(10) Patent No.: US 9,932,509 B2
(45) Date of Patent: Apr. 3, 2018

(54) USE OF A CALCIUM POTASSIUM NITRATE SALT FOR THE MANUFACTURE OF A HEAT TRANSFER FLUID

(71) Applicant: YARA INTERNATIONAL ASA, Oslo (NO)

(72) Inventors: Torstein Obrestad, Ulefoss (NO); Amund Myrstad, Skien (NO); Tore Frogner, Sylling (NO)

(73) Assignee: YARA INTERNATIONAL ASA, Oslo (NO)

( * ) Notice: Subject to any disclaimer, the term of this patent is extended or adjusted under 35 U.S.C. 154(b) by 93 days.

(21) Appl. No.: 14/427,518

(22) PCT Filed: Sep. 17, 2013

(86) PCT No.: PCT/EP2013/069209
§ 371 (c)(1),
(2) Date: Mar. 11, 2015

(87) PCT Pub. No.: WO2014/044652
PCT Pub. Date: Mar. 27, 2014

(65) Prior Publication Data
US 2015/0344762 A1 Dec. 3, 2015

(30) Foreign Application Priority Data
Sep. 18, 2012 (NO) .................................... 20121058

(51) Int. Cl.
C09K 5/12 (2006.01)
(52) U.S. Cl.
CPC ..................... C09K 5/12 (2013.01)
(58) Field of Classification Search
None
See application file for complete search history.

(56) References Cited

U.S. PATENT DOCUMENTS 4,430,241 A 2/1984 Fiorucci
6,083,418 A 7/2000 Czarnecki et al.
(Continued)

FOREIGN PATENT DOCUMENTS

CN 102533226 7/2012
DE 10 2010 041 460 1/2012
(Continued)

OTHER PUBLICATIONS

International Search Report and Written Opinion of the International Searching Authority dated Dec. 6, 2013 in International (PCT) Application No. PCT/EP2013/069209.
(Continued)

Primary Examiner — Necholus Ogden, Jr.
(74) Attorney, Agent, or Firm — Wenderoth, Lind & Ponack, L.L.P.

(57) ABSTRACT

The present invention relates to the use of a double salt of $Ca(NO_3)_2$ and $KNO_3$ for the manufacture of a melt, in particular a nitrate-based heat transfer fluid (HTF) and/or thermal energy storage fluid, for example in solar energy applications, such as in solar electrical power plant systems using a parabolic through, a central receiver or a linear Fresnel, which have both a low melting temperature and a high decomposition temperature, as well as to methods for the manufacture thereof. Using said double salt, a melt could be manufactured comprising at least $NaNO_3$, $KNO_3$ and $Ca(NO_3)_2$, preferably, an eutectic ternary melt comprising $Ca(NO_3)_2$, $NaNO_3$ and $KNO_3$ in a weight ratio of about 42:15:43 with an operating temperature of about 131° C. to about 560° C.

13 Claims, 2 Drawing Sheets

(56) References Cited

U.S. PATENT DOCUMENTS 7,588,694 B1 * 9/2009 Bradshaw ............... C01B 21/48
252/67
2013/0180519 A1 7/2013 Gröppel et al.

FOREIGN PATENT DOCUMENTS

EP          0 049 761      4/1982
WO         2012/119854     9/2012

OTHER PUBLICATIONS

International Preliminary Report on Patentability dated Dec. 12, 2014 in International (PCT) Application No. PCT/EP2013/069209.
Bradshaw et al., "High-temperature stability of ternary nitrate molten salts for solar thermal energy systems", Solar Energy Materials, vol. 21, 1990, pp. 51-60.
Bauer et al., "Overview of molten salt storage systems and material development for solar thermal power plants", World Renewable Energy Forum, May 17, 2012, XP 55050134, pp. 1-8.

* cited by examiner

USE OF A CALCIUM POTASSIUM NITRATE SALT FOR THE MANUFACTURE OF A HEAT TRANSFER FLUID

FIELD OF THE INVENTION

The present invention relates to the use of a calcium potassium nitrate salt for the manufacture of a melt, in particulate a nitrate-based heat transfer fluid (HTF) and/or thermal energy storage fluid, for example in solar energy applications, such as in solar electrical power plant systems using a parabolic through, a central receiver or a linear Fresnel, which have both a low melting temperature and a high decomposition temperature, as well as to a method for the manufacture thereof.

BACKGROUND OF THE INVENTION

Concentrating solar power (CSP) uses mirrors to focus solar energy to boil water and to make high pressure steam. The steam subsequently drives a turbine and generator unit to generate electricity. There is a need to bring CSP electricity cost down to the point of being competitive with traditional fossil fuel-based electricity. An advanced low melting point heat transfer fluid (HTF) with a high thermal stability is a key technical advance necessary to reduce the cost of CSP electricity. Such a material would enable higher temperature operation and increased efficiency in converting solar energy to electricity. Increasing the maximum fluid output temperature of current CSP plants from 390° C. to 500° C. would increase the conversion efficiency of the Rankine power block, thereby reducing the levelized energy cost by 2 cents/kWh. Achieving 500° C. operation would also double the effectiveness of sensible heat thermal storage systems, significantly reducing the capital cost of thermal storage (Justin W. Raade and David Padowitz, *Development of Molten Salt Heat Transfer Fluid With Low Melting Point and High Thermal Stability*, J. Sol. Energy Eng. 133, 031013 (2011)).

Furthermore, an advanced low melting point heat transfer fluid could also be used as a thermal energy storage fluids in solar energy applications. Heat storage allows a solar thermal plant to produce electricity at night and on overcast days. This allows the use of solar power for continuous power generation as well as peak power generation, with the potential of displacing both coal- and natural gas-fired power plants. Additionally, the utilization of the generator is higher which reduces cost.

Heat is transferred to a thermal storage medium in an insulated reservoir during the day, and withdrawn for power generation at night. The envisioned product should be cheap to produce, easy to make and easy to handle.

A number of different solutions to the aforementioned problem has been proposed, one of them being the use of nitrate-based salts used as a melt (molten salt). Molten salts exhibit many desirable heat transfer qualities at high temperatures. They have high density, high heat capacity, high thermal stability, and very low vapour pressure even at elevated temperatures. Their viscosity is low enough for sufficient pumpability at high temperatures, and many are compatible with common stainless steels. Salts of many varieties are currently available in large commercial quantities from several suppliers.

Most commonly, a binary salt based on $NaNO_3$ and $KNO_3$ and commonly known as Solar Salt, is used as heat transfer fluids and as thermal energy storage fluids. The Solar Salt consists of the eutectic mixture of 60% $NaNO_3$ and 40% of $KNO_3$. $NaNO_3$ melts at 307° C. and $KNO_3$ melts at 337° C. The mixture at its eutectic point exhibits a drastically reduced melting point of 222° C. This represents a melting point suppression of 85° C. from the lowest melting single component. It is produced as a double salt in solid (granular) form, for example as disclosed in U.S. Pat. No. 4,430,241 (Fiorucci, 1984). Although the salt is very cheap and has a high thermal stability, a major drawback of this salt is its high melting temperature (220° C.).

Bradshaw et al. in Solar Energy Materials 21 (1990) 51-60 describe the use of ternary nitrate salts comprising nitrate salts of Na, Ca and K, for solar thermal energy systems (see Table1 therein). Adding $Ca(NO_3)_2$ to the Solar Salt showed to lower the melting temperature, which is an advantage as it lowers the risk of solidifying of the salt mixture in the system, blocking pumps, piping, etc.

As is commonly known, $Ca(NO_3)_2$ in its anhydrous form is a hygroscopic solid, forming the (liquid) tetrahydrate salt $Ca(NO_3)_2.4H_2O$ with a melting point of about 43° C. It is commercially available as a liquid solution or in solid particulate form, where it is mixed with ammonium nitrate to reduce its tendency to absorb water, in particulate water from the air. In its particulate form, it is difficult to handle.

From the disclosed melt compositions in Bradshaw et al. in Solar Energy Materials 21 (1990) 51-60, it can be concluded that the thermal stability decreases with increasing amounts of $Ca(NO_3)_2$. At amounts of 42 weight % of $Ca(NO_3)_2$, the decomposition temperature is about 500° C. and a solid phase ($CaCO_3$) was visually detected. Similar research was conducted by the US Department of Energy and the Sandia National Laboratories and several reports are available on the internet (see e.g. Steven St. Laurent, Thermocline Thermal Storage Test for Large-scale Solar Thermal Power Plants), where a melt mixture is disclosed manufactured from melting together 30 weight % of $Ca(NO_3)_2$, 24 weight % of $NaNO_3$, and 46% of $KNO_3$, all in solid form.

Hitec XL (Coastal Chemical) is commercially available as an aqueous solution of a ternary nitrate salt mixture containing 59 weight % water, comprising $Ca(NO_3)_2$, $NaNO_3$ and $KNO_3$, of which different compositions have been reported. When the water is boiled off, the melt has a composition which has been reported to be 15% $NaNO_3$, 43% $KNO_3$ and 42% $Ca(NO_3)_2$ (Kelly et al., 2007), whereas Kearney et al (2003) quote 7% $NaNO_3$, 45% $KNO_3$ and 48% $Ca(NO_3)_2$. The eutectic mixture lies at a concentration ratio of 7%/30%/63% (ENEA, 2001). In practice, and mainly for cost reasons, the exact eutectic concentration is not employed as the solidification temperature is not very sensitive to the exact mixing ratio (Large-Scale Solar Thermal Power, Werner Vogel and Henry Kalb, Wiley-VCH Verlag GmbH & Co, KGaA, Weinheim, 2010, page 245. The Hitec XL mixture is manufactured by dissolving the three salts ($Ca(NO_3)_2$, $NaNO_3$ and $KNO_3$) in water. It has the disadvantage that, in order to obtain the eutectic melt, this high amount of water (59 weight %) needs to be boiled off, leading a large energy consumption.

U.S. Pat. No. 7,588,694 B1 (Bradshaw et al., 2009) describes the use of quaternary compositions comprising nitrate salts of Na, K, Li and Ca. For comparison, an eutectic nitrate salt composition is disclosed containing 21 mol % Na, 49 mol % K, and 30 mol % Ca, having a melting temperature of 133° C. (Table 2). No decomposition temperature is given. Also, for comparison, an eutectic nitrate salt composition is disclosed containing 30 mol % Na, 50 mol % K, and 20 mol % Ca, having a melting temperature of 505° C. (Table 3). No melting temperature is given. The use of lithium nitrate is undesirable due to the high cost thereof.

There is little or no research on higher order mixtures of nitrates.

Hence, there is a need for a low-cost nitrate salt based mixture that has both a low melting temperature and a high decomposition temperature, and is easy to make and to handle.

DETAILED DESCRIPTION OF THE INVENTION

It is an object of the present invention to provide a nitrate salt composition for use as heat transfer fluid (HTF) and as thermal energy storage fluids which have both a low melting temperature and a high decomposition temperature, as well as to a method for the production thereof, and which are easy to make and to handle.

This object is met by the double salt of $Ca(NO_3)_2$ and $KNO_3$ of the present invention according to the independent claim 1.

The inventors have realized that the use of a double salt comprising $Ca(NO3)_2$ and $KNO_3$, hereafter called Ca/K double salt, has unique properties which allows it to be used easily for the manufacture of a nitrate-based heat transfer fluid (HTF), in particular to produce a melt comprising $NaNO_3$, $KNO_3$ and $Ca(NO_3)_2$.

According to one embodiment, the Ca/K double salt is a particulate product from a melt, comprising 1.5 to 5.5 weight % of K (present as $KNO_3$), 70 to 80 weight % of $Ca(NO_3)_2$ and 13 to 18 weight % of water.

According to another embodiment, the Ca/K double salt is a particulate product from a melt, comprising 2.5 to 4.0 weight % of K (present as $KNO_3$), 74 to 75 weight % of $Ca(NO_3)_2$ and 15 to 16 weight % of water.

According to one embodiment, the double salt of $Ca(NO_3)_2$ and $KNO_3$ is ammonium-free.

According to a preferred embodiment, the particulate product is a product marketed under the tradename "NitCal/K" by Yara International, Oslo, Norway. NitCal/K is a Ca/K nitrate with the general formula $KNO_3.5Ca(NO_3)_2.10H_2O$ and having an average chemical composition of about 9 weight % of $KNO_3$ (about 3.5 weight % of K), about 74 weight % of $Ca(NO_3)_2$ and about 16 weight % of water. It can be manufactured as a free-flowing solid particulate product with a low water absorption and caking tendency.

Although the different components may be provided as a combined aqueous solution, such as the Hitec XL solution, or as different aqueous solutions of $Ca(NO_3)_2$, $KNO_3$ and $NaNO_3$, the advantage of the present invention is that a melt can be produced based on mixing solid components only, followed by controlled heating, i.e. heating up the solid mixture using a specific temperature program and/or temperature gradient. This process avoids removal of the water from the aqueous solution according to the prior art.

According to one embodiment, a melt comprising at least $NaNO_3$, $KNO_3$ and $Ca(NO_3)_2$ is produced, comprising mixing $NaNO_3$, $KNO_3$, and the Ca/K double salt in their particulate form according to the invention, followed by controlled heating and melting of the resulting mixture. The skilled person will understand that several other options are available for mixing and melting the three components, such as mixing two out of three components and adding a third component to the melt.

According to one embodiment, the Ca/K double salt is used to directly produce an HTF (i.e. a melt), in particular to produce an HTF (i.e. a melt) comprising $NaNO_3$, $KNO_3$ and $Ca(NO_3)_2$. When the Ca/K double salt used as a source of Ca, this avoids boiling of large amounts of water, as is the case of the Hitex XL product. Within the context of this invention, with "directly" is meant a use which does not involve the production of an intermediate solid product comprising $NaNO_3$, $KNO_3$ and $Ca(NO_3)_2$.

According to one embodiment, the melt comprises $Ca(NO_3)_2$, $NaNO_3$ and $KNO_3$ in a weight ratio of (30 to 50):(10 to 20):(30 to 50), provided the sum of the weight of $Ca(NO_3)_2$, $NaNO_3$ and $KNO_3$ is 100%.

According to a preferred embodiment, the melt comprises $Ca(NO_3)_2$, $NaNO_3$ and $KNO_3$ in a weight ratio of about 42:15:43, provided the sum of the weight of $Ca(NO_3)_2$, $NaNO_3$ and $KNO_3$ is 100%. The latter ratio is about the eutectic point of the ternary composition and offers the lowest melting point. Hence, it is advantageous to mix the three components in a solid particulate form and melt the resulting particulate mixture, as less energy will be required.

With the composition according to the invention, a melting temperature of about 131° C. is achieved, which is advantageously lower that achieved using the currently used binary salt (220 C.) and is in the range of melting temperatures disclosed in the prior art for this kind of ternary salt.

With the composition according to the invention, a decomposition temperature of 536° C. is achieved, which is surprisingly in the same range, and even higher, than the decomposition temperature of the currently used Solar Salt (525° C.) and higher than the reported decomposition temperature of the HitecXL product (500° C.). Very surprisingly, using the Nitcal/K product as described above in admixture with $NaNO_3$ and $KNO_3$ salts of a superior quality (i.e. containing few impurities), the resulting melt having a weight ratio of about 42:15:43 can reach a decomposition temperature of 569° C. (at 3% weight loss), which is surprisingly high, such that an upper operating temperature of the melt of about 550 to 560° C. is achievable. Using $NaNO_3$ and $KNO_3$ salts of a lower quality (i.e. containing more impurities), a decomposition temperature of 525° C. (at 3.5% weight loss) is obtained, which corresponds to an upper operating temperature of the melt of about 510 to 530° C. Without being bound by theory, it is assumed that these high upper operating temperatures are achievable due to the high quality of the Nitcal/K product, i.e. its low level of impurities. Hence, using the Nitcal/K product as described above, in admixture with $NaNO_3$ and $KNO_3$ salts of a high quality (i.e. containing few impurities), the resulting melt having a weight ratio of about 42:15:43 has a wide operating temperature of about 131° C. to about 560° C. A wide temperature range is advantageous as less salt is needed to absorb the same amount of energy.

Furthermore, when using the specific Nitcal/K product for manufacturing the HTF melt, which is chloride-free, the HTF melt is much less corrosive than other existing HTF melts, which means that the lifetime of system components in contact with the HTF melt is extended.

The Ca/K double salt may be produced according to a method disclosed in U.S. Pat. No. 6,610,267 (Norsk Hydro, 2003), which document is enclosed herein by reference. In summary, a melt is produced by mixing a potassium source with a calcium nitrate source and heating the mixture to a temperature of 150 to 155° C. An aqueous $Ca(NO_3)_2$ solution is suitable as a calcium nitrate source. Potassium nitrate ($KNO_3$) in a solid or aqueous form is suitable as a potassium source, but alternatively also KOH, neutralised with nitric acid can be used as a potassium source. Prior to conventional particulation, the water content in the melt is adjusted by evaporation. Furthermore, it was found that undercooling was avoided and that particulation with conventional methods (such as prilling and granulation) was possible when the melt has a certain concentration ratio of K, $Ca(NO_3)_2$ and water, in particular comprising 1.5 to 5.5 weight % of K (present as $KNO_3$), 70 to 80 weight % of $Ca(NO_3)_2$ and 13 to 18 weight % of water. Granulation provided particles with a nice spherical shape, and the crushing strength of 2.8 mm particles was 3 to 5 kg. No caking or post-melt reactions occurred during cooling of the material.

The invention also relates to a method for the manufacture of a melt as disclosed in the application.

According to one embodiment, the invention relates to the manufacture of a nitrate-based heat transfer fluid (HTF), comprising mixing a double salt of $Ca(NO_3)_2$ and $KNO_3$, and at least $NaNO_3$ and $KNO_3$, followed by controlled heating and melting of the resulting mixture. The melt may be used directly as an HTF or as a thermal energy storage fluid.

According to one embodiment, the invention relates to the manufacture of a nitrate-based melt, preferably to be used as heat transfer fluid (HTF) and/or a thermal storage fluid, comprising mixing a double salt of $Ca(NO_3)_2$ and $KNO_3$, with $NaNO_3$ and $KNO_3$.

According to another embodiment, the invention relates to the manufacture of a nitrate-based melt, preferably to be used as heat transfer fluid (HTF) and/or a thermal storage fluid, comprising mixing a double salt of $Ca(NO_3)_2$ and $KNO_3$, with $NaNO_3$ and $KNO_3$, wherein 56 weight % of the double salt of $Ca(NO_3)_2$ and $KNO_3$, 15 weight % of $NaNO_3$ and 38 weight % of $KNO_3$ are mixed, followed by controlled heating and melting of the resulting mixture, such that the resulting melt comprises $Ca(NO_3)_2$, $NaNO_3$ and $KNO_3$ in a weight ratio of about 42:15:43. Such a method provides a (nearly) eutectic melt having a low melting point and a high decomposition point.

According to a preferred embodiment, the double salt of $Ca(NO_3)_2$ and $KNO_3$, $NaNO_3$ and $KNO_3$ are mixed in a solid particulate form. This has the advantage that said components of the melt may be used on conventional systems which are designed and are being used for the production of the binary Solar Salt, without large investments.

The invention will now be illustrated by an example. Such example should not be construed as limiting the scope of the invention, which is defined by the appended claims.

EXAMPLES

Example 1

To obtain an eutectic ternary melt consisting of 42 weight % of $Ca(NO_3)_2$, 15 weight % of $NaNO_3$ and 43 weight % of $KNO_3$, 15 weight % of particulate $NaNO_3$ (technical grade), 38 weight % of particulate $KNO_3$ (technical grade) and 56 weight % of particulate Nitcal/K (Yara International SA, Oslo) was mixed in a laboratory scale mixer and heated to about 131° C., at which temperature the melting of the mixture started. All the water was evaporated at a temperature of about 250° C. The composition of Nitcal/K is 9.2 weight % $KNO_3$, 74.5 weight % $Ca(NO_3)_2$ and 16.3 weight % of water.

Figure 1:
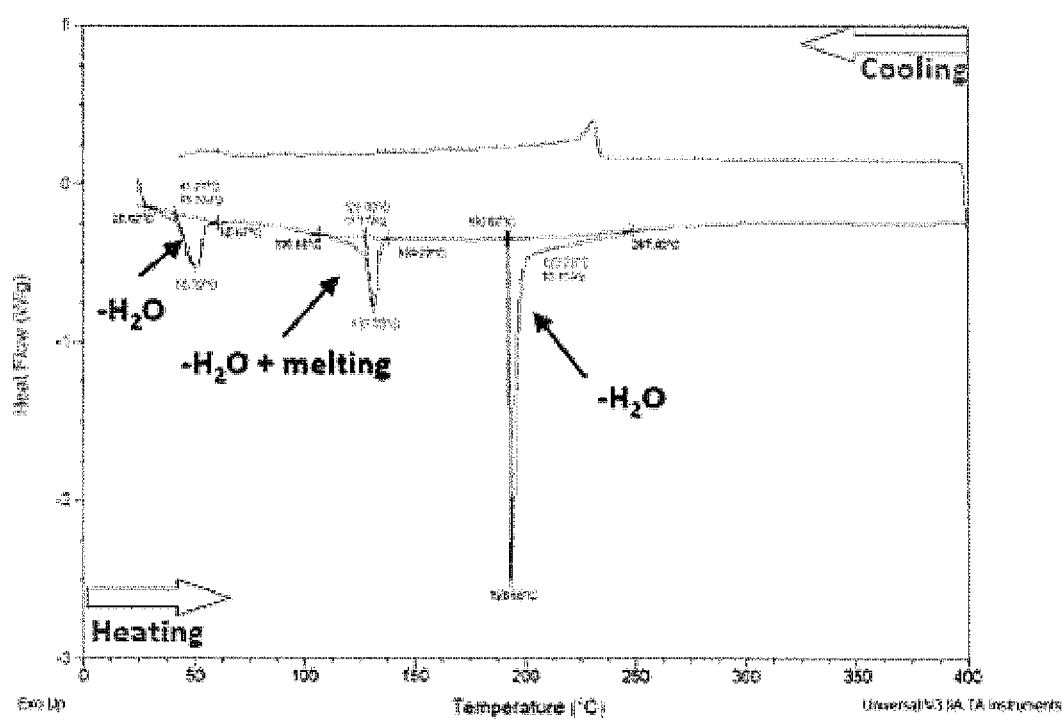
FIG. 1: Differential Scanning calorimetric (DSC) diagram of the ternary salt mixture consisting of 42 weight % of $Ca(NO_3)_2$, 15 weight % of $NaNO_3$ and 43 weight % of $KNO_3$.

A DSC diagram of the ternary mixture is shown in FIG. 1 showing the melting behaviour of the mixture.

Figure 2:
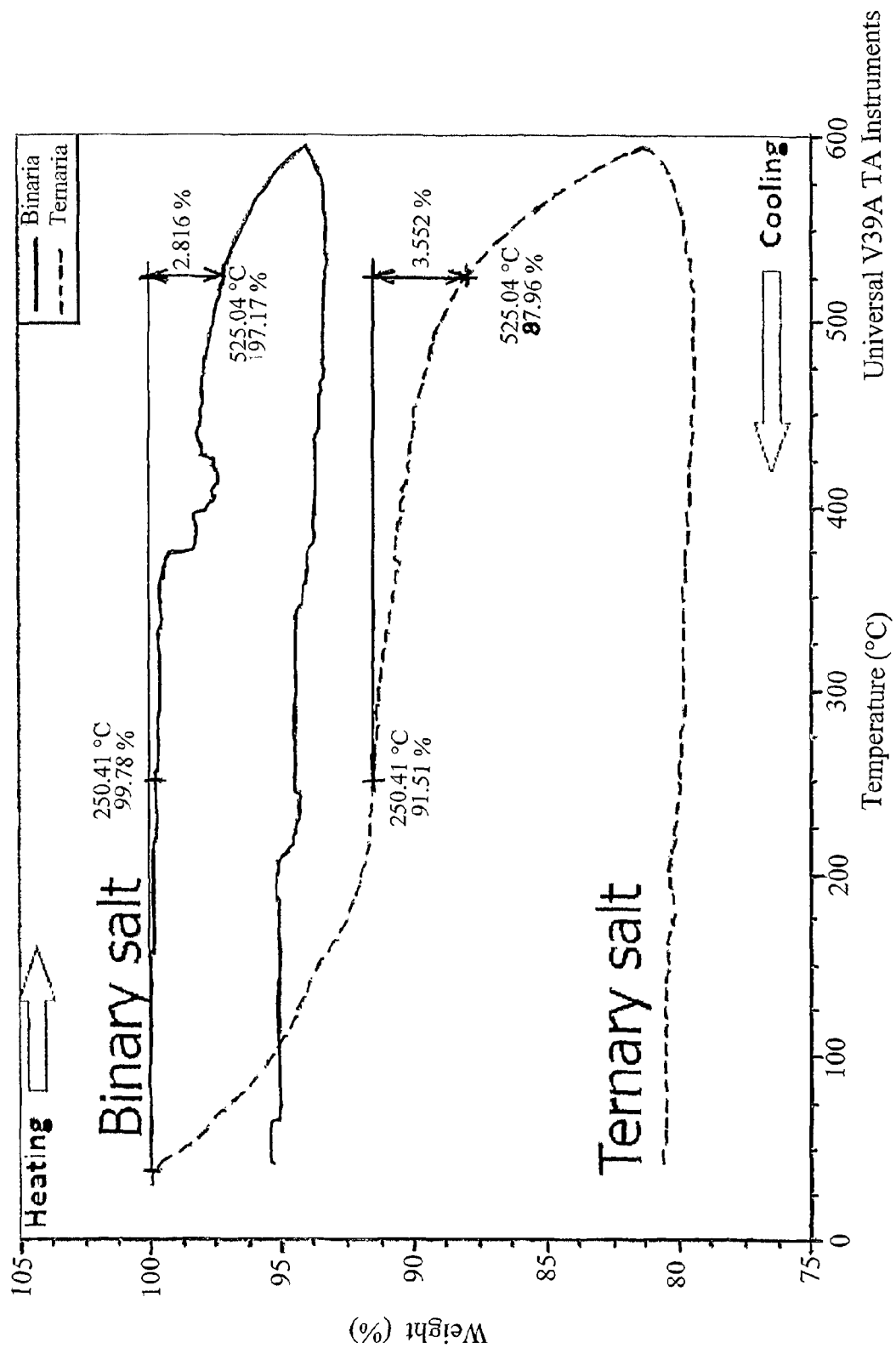
FIG. 2: Thermogravimetric analysis (TGA) of the ternary salt melt consisting of 42 weight % of $Ca(NO_3)_2$, 15 weight % of $NaNO_3$ and 43 weight % of $KNO_3$.

A thermogravimetric analysis (TGA) of the ternary salt melt is shown in FIG. 2, in comparison with the commonly used binary melt (Solar Salt). It shows a decomposition temperature of 525° C. at a 3.5 weight loss, compared to a decomposition temperature of 525° C. at a 2.8 weight loss for the binary melt.

The invention claimed is:

1. A method for manufacturing a nitrate-based heat transfer fluid comprising mixing a double salt of $Ca(NO_3)_2$ and $KNO_3$, with $NaNO_3$ and $KNO_3$, followed by controlled heating and melting of the resulting mixture.

2. The method according to claim 1, wherein 56 weight % of a double salt of $Ca(NO_3)_2$ and $KNO_3$, 15 weight % of $NaNO_3$, and 38 weight % of $KNO_3$ are mixed, followed by controlled heating and melting of the resulting mixture, such that the resulting melt comprises $Ca(NO_3)_2$, $NaNO_3$, and $KNO_3$ in a weight ratio of about 42:15:43.

3. The method according to claim 1, wherein the double salt of $Ca(NO_3)_2$ and $KNO_3$, $NaNO_3$ and $KNO_3$ are mixed in a solid particulate form.

4. A particulate mixture comprising a) a double salt of $Ca(NO_3)_2$ and $KNO_3$, b) $NaNO_3$, and c) $KNO_3$, and all of them being a solid particulate form.

5. The method according to claim 1, wherein the heat transfer fluid comprises $Ca(NO_3)_2$, $NaNO_3$, and $KNO_3$ in a weight ratio of (30 to 50):(10 to 20):(30 to 50), provided that the sum of the weight of $Ca(NO_3)_2$, $NaNO_3$, and $KNO_3$ is 100%.

6. The method according to claim 1, wherein the double salt of $Ca(NO_3)_2$ and $KNO_3$ is a particulate product from a melt comprising 1.5 to 5.5 weight % of K, which is present as $KNO_3$, 70 to 80 weight % of $Ca(NO_3)_2$, and 13 to 18 weight % of water.

7. The method according to claim 1, wherein the double salt of $Ca(NO_3)_2$ and $KNO_3$ is a particulate product from a melt comprising 2.5 to 4.0 weight % of K, which is present as $KNO_3$, 74 to 75 weight % of $Ca(NO_3)_2$, and 15 to 16 weight % of water.

8. The method according to claim 1, wherein the double salt of $Ca(NO_3)_2$ and $KNO_3$ has the general formula $KNO_3 \cdot 5Ca(NO_3)_2 \cdot 10H_2O$ and has an average chemical composition of about 9 weight % of $KNO_3$, which is about 3.5 weight % of K, about 74 weight % of $Ca(NO_3)_2$, and about 16 weight % of water.

9. The method according to claim 1, wherein the double salt of $Ca(NO_3)_2$ and $KNO_3$ is ammonium-free.

10. The method according to claim 1, wherein the heat transfer fluid has a melting temperature of 131° C.

11. The method according to claim 1, wherein the heat transfer fluid has a decomposition temperature of at least 510° C.

12. The method according to claim 1, wherein the heat transfer fluid has a decomposition temperature of at least 525° C.

13. The method according to claim 1, wherein the heat transfer fluid has a decomposition temperature of at least 550° C.

* * * * *